UNITED STATES PATENT OFFICE.

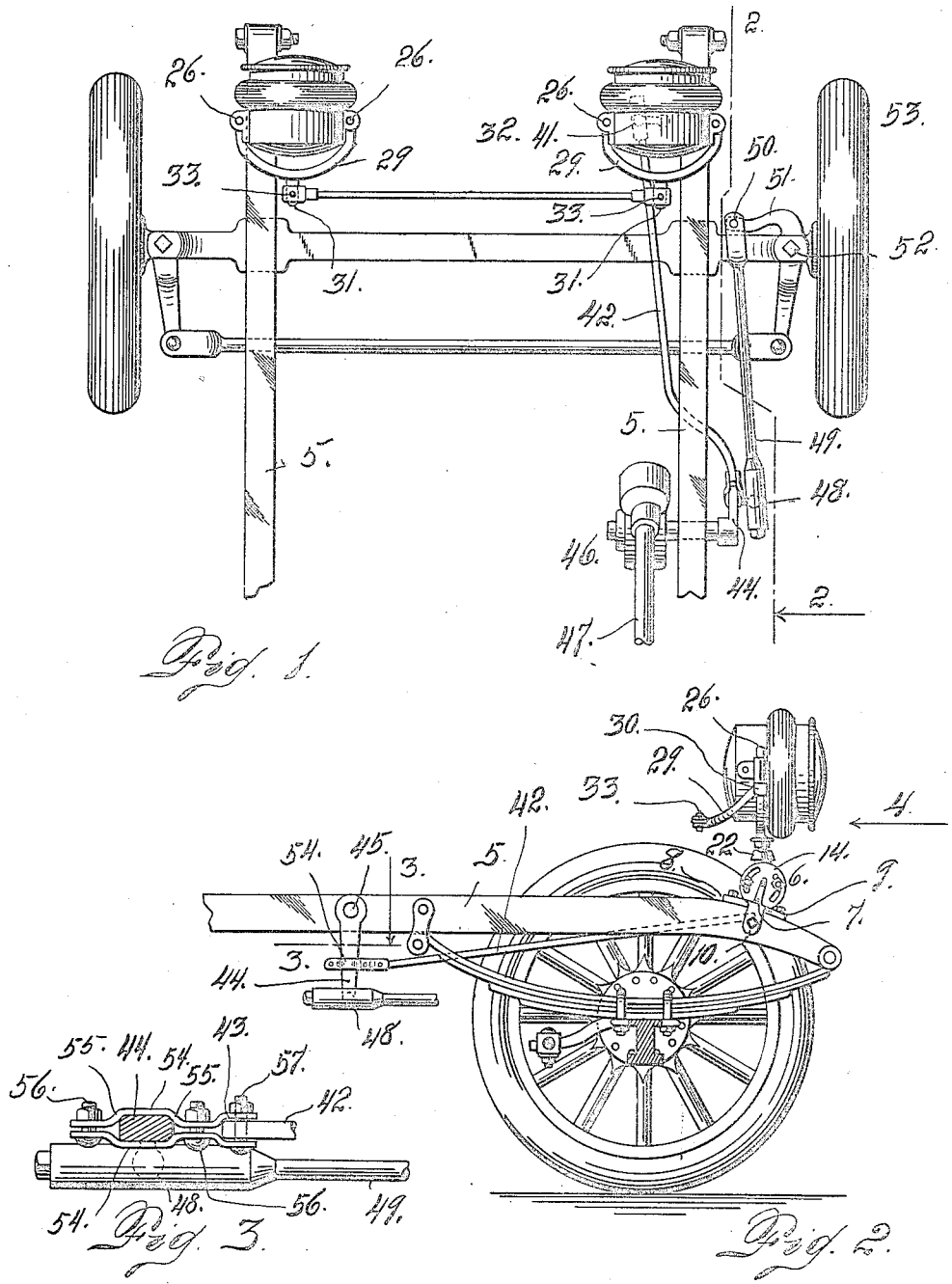

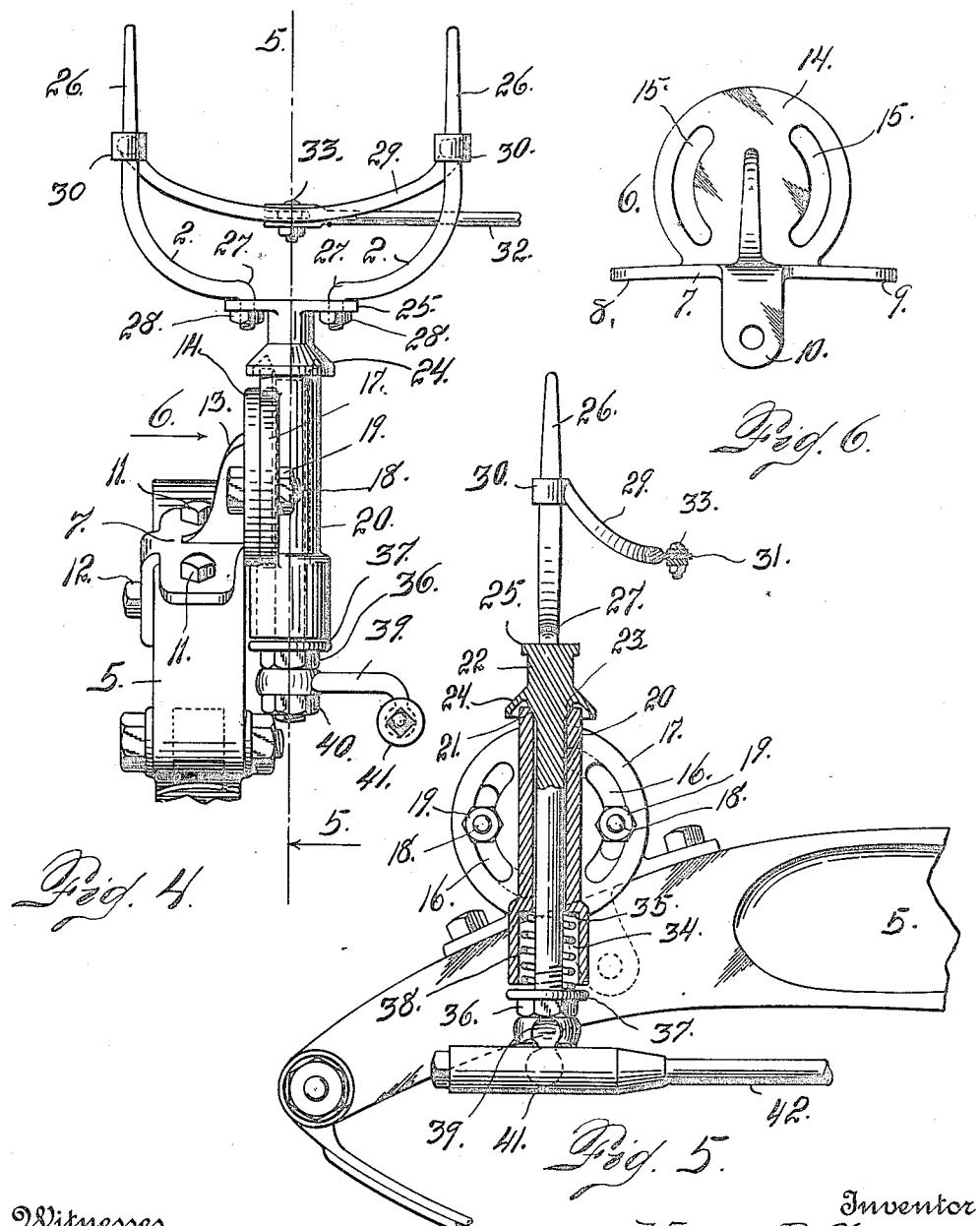

HENRY P. GOW, OF DENVER, COLORADO.

DIRIGIBLE HEADLIGHT FOR AUTOMOBILES.

1,149,977.   Specification of Letters Patent.   Patented Aug. 10, 1915.

Application filed December 27, 1913. Serial No. 808,975.

*To all whom it may concern:*

Be it known that I, HENRY P. Gow, citizen of the United States, residing in the city and county of Denver and State of Colorado, have invented certain new and useful Improvements in Dirigible Headlights for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in dirigible headlights for automobiles, my object being to provide a simple and practicable construction, whereby the lamps are pivotally mounted upon the forward portion of the frame and may be controlled or manipulated to correspond to the course of the vehicle, and thus light may be maintained continuously upon the road, whether the said vehicle is turning a curve or traveling upon a straight track. This is of the utmost importance, since under ordinary conditions when the lamps are rigidly mounted the light will conform to the course of the machine only as long as the machine is running upon a straight road and when a curve is turned the light is thrown outwardly or to one side of the road on the side opposite that toward which the machine is directed, whereby that portion of the road immediately in front of the machine is left in complete darkness and serious accidents may occur because of hidden obstacles.

An important feature of my invention is that the lamps may be mounted as far forward upon the frame bars as may be desired, since the fittings upon which the said lamps are mounted can be made to conform to any curve which the frame bars may assume, and thus the forward curved portions of the frame bars to which the springs are attached present no obstacle to the mounting of my construction.

Another important feature of my invention is that no matter upon what portion of the bars the lamps may be mounted, the latter can always be adjusted to assume a vertical position, or one inclined to the vertical, which latter position may at times be very advantageous, considering the speed at which the vehicle is traveling.

Still another feature of my invention is that the posts which support the lamps are mounted under tension, thus reducing the vibration to which the lamps are subjected to the minimum, and at the same time providing means whereby any looseness that may become apparent in the bearings can be taken up by turning a nut threaded upon the lower extremities of said posts.

Having briefly outlined my improved construction, I will proceed to describe the same in detail, reference being made to the accompanying drawing, in which is illustrated an embodiment thereof.

In this drawing: Figure 1 is a top plan view of the front part of the frame-work and running gear of an automobile equipped with my improved dirigible headlight construction. Fig. 2 is a section taken on the line 2—2, Fig. 1, looking toward the left. Fig. 3 is a section taken on the line 3—3, Fig. 2, looking in the direction of the arrow, the parts, however, being shown on a larger scale. Fig. 4 is an enlarged view of the manner in which one of the lamps is mounted looking in the direction of the arrow 4, Fig. 2. Fig. 5 is a vertical section taken on the line 5—5, Fig. 4, looking in the direction of the arrow. Fig. 6 is a detail view of the fitting or bracket employed looking in the direction of the arrow 6, Fig. 4.

The same reference characters indicate the same parts in all the views.

Let the numeral 5 designate each of the frame bars of an automobile body upon the forward portions of which are mounted integral fittings or brackets 6, each consisting of a base plate 7, having ears 8, 9 and 10, the ears 8 and 9 extending in opposite directions from each other, while the ear 10 is bent to form a right angle with the said base plate 7. The ears 8 and 9 are perforated and adapted to be secured to the upper surface of the frame bar by suitable fastening means 11. The ear 10 is also perforated and adapted to be secured to the outer surface of the frame bar by a fastening member 12. These brackets 6 are made of malleable iron, whereby the base plate 7 may be bent to conform to any curve or incline which the frame bars may present and it is this feature of my invention which makes it practicable to mount the lamps as far forward upon the said frame bars as may be desired.

Projecting upwardly and forming a right angle with the base plate 7 of each bracket is a disk 14, reinforced by a rib 13, the said disk occupying a position directly inside of the frame bars 5 and in a plane parallel with the vertical plane of said bars. This disk 14 has two elongated slots 15 formed therein, the said slots being curved to conform with the periphery of the disk. These slots register with similarly formed slots 16 in a disk 17, the said slots adapted to receive bolts 18, the heads of which bear against the outer surface of the disk 14, while their free extremities project beyond the inner surface of the disk 17, and have nuts 19 threaded thereon, the said nuts adapted to be securely held against the inner surface of the said disk 17 when the lamps are in the desired position.

It is by virtue of this construction, as will more fully hereinafter appear, that the lamps may always be supported in a vertical position, or one inclined to the vertical, within a reasonable range, regardless of the incline upon which the bracket 6 is mounted.

Formed integral with the disk 17 and supported thereby is a sleeve 20, the inner surface of the said sleeve at its upper extremities being beveled as shown at 21. Inserted within the sleeve 20 and extending below the same is a post 22 having a conical portion 23 which is seated into the beveled extremity of the sleeve, whereby a cone bearing is formed upon which the post 22 may be rotated. Formed integral with the said post near its upper extremity and flared away from the latter is a part 24 projecting beyond and below the upper extremity of the sleeve 20, thus forming a hood or dust cap for the cone bearing.

The post 22 at its upper extremity is provided with a horizontally disposed plate 25, the opposite extremities of which are perforated to receive the lower extremities of spaced forks 26 which are bent inwardly at 2 and downwardly at 27, whereby said lower extremities will project below the plate 25. Nuts 28 are threaded upon these extremities and are adapted to bear against the under surface of the plate 25 for securing the forks 26 in the desired position.

Each pair of forks is connected by a reach or arm 29, semi-circular in shape, and enlarged at its extremities as shown at 30, said enlarged extremities being perforated and adapted to fit over the said forks 26. At approximately half way between their extremities, each reach or arm, is provided with a rearwardly extending lug 31, which is inserted between the bifurcated extremities of a connecting rod 32. Each lug 31 has a perforation therein which is adapted to register with openings formed in the said bifurcated extremities of the rod 32 and bolts or other suitable fastening means 33 are passed therethrough for rigidly securing the same together.

The interior sleeve 20 is enlarged at its lower extremity, as shown at 34, whereby a shoulder 35 is formed therein. The lower extremity of the post 22 which extends below the said sleeve is threaded to receive a nut 36, which supports a washer 37. Located within the enlarged portion 34 of the sleeve is a coil spring 38, one extremity of which bears against the shoulder 35 of the sleeve 20, while its opposite extremity rests upon the washer 37 mounted upon the post 22.

It can be readily seen from the foregoing description that the lamp post 22 is mounted under tension, and the degree of tension may be increased or lessened by screwing the nut 36 up and down as the occasion may require.

To the lower threaded extremity of the post 22 below the nut 36 is secured a crank-arm 39, the engaging extremity of said crank-arm being held in place by a nut 40 which is applied to said threaded extremity. The opposite extremity of the crank-arm 39 is pivotally connected by a ball and socket joint, as shown at 41, with the forward extremity of a rearwardly extending rod 42, whose rear extremity is pivotally connected as shown at 43 with a crank-arm 44, fast on a shaft 45, having a worm gear connection 46, with the steering post 47 of the machine. The crank-arm 44 is also connected in operative relation and in the usual manner, as shown at 48, with the rear extremity of a forwardly extending rod 49, whose forward extremity is pivotally connected as shown at 50 with a crank-arm 51 connected as shown at 52 in operative relation with the forward wheels 53 of the automobile for turning the same for steering purposes as the steering post 47 is operated.

The pivotal connection 43 of the rod 42 with the crank-arm 44 is maintained by two metal straps 54, one applied to each side of the crank-arm 44 and extending forwardly and rearwardly from the latter, said extensions being bent toward each other at 55 and secured together by suitable fastening means 56. The forward extremities of the metal straps 54 are again bent outwardly to receive the rear extremity of the rod 42 which is pivotally mounted therein upon a bolt 57 passed through registering perforations formed in the rear extremity of the rod 42 and the forward extremities of the metal straps 54.

From the foregoing description my improved construction will be readily understood. By virtue of the connections heretofore explained, as the steering post 47 is operated, the shaft 45, by virtue of its operative connection (not shown in detail because it is old in the art) with the steering post 47, will be rotated and the wheels of the machine will be turned for steering purposes. Simultaneously with the operation of the wheels 53 of the vehicle for steering purposes, the lamps will be correspondingly shifted by virtue of the connection heretofore explained between the crank-arm 44 of the shaft 45 and the crank-arm 39 of one of the posts 22 of the lamp-holder, through the medium of the rod 42, together with the rod 32 which connects the respective sets of forks upon which the lamps are fitted.

It will also be readily understood from the foregoing description that by loosening the nuts 19 the disk 17 may be turned upon the disk 14 by virtue of the registering elongated slots therein, until the lamp is in the desired position, when the nuts 19 are again tightened and the lamp rigidly secured in a vertical position, or one inclined thereto, as may be desired. Heretofore, in so far as I am aware, the supports for lamps of this character could only be mounted upon the straight portions of the frame bars, since if they were mounted upon a curved part of the same the lamps would be supported at an angle to the vertical, which fact under most circumstances would render the said lamps practically useless. However, as before mentioned, under certain conditions it may be advisable to tip the lamps at an angle to the vertical, but this is certainly not true under ordinary conditions, and when a condition arises which makes such an adjustment necessary, my lamps may be moved to the desired position, as heretofore explained.

Attention is also called to the fact that semi-circular arms or reaches 29 not only provide means whereby the lamps may be turned in unison, but perform the very important function of bracing the forks 26, thereby providing additional security for retaining the said forks in the desired position.

Having thus described my invention what I claim is:

1. The combination with a frame of an automobile, of a member mounted thereon comprising a base plate and a part projecting upwardly therefrom, said part provided with elongated slots, supporting means also having elongated slots therein and adapted to engage the upwardly projecting part of the base plate in such a manner that their slots register, and securing means passed through said slots for the purpose set forth.

2. The combination with the frame of an automobile, of a bracket mounted thereon, including an upwardly projecting disk, said disk being provided with slots, supporting means also having slots therein and adapted to engage the disk so that their respective slots will register, and securing means passed through said slots for the purpose set forth.

In testimony whereof I affix my signature in presence of two witnesses.

HENRY P. GOW.

Witnesses:
L. HALL,
A. EBERT O'BRIEN.